May 26, 1959 — W. HALPERN ET AL — 2,887,872
METHOD OF MEASURING AND COMPENSATING FOR DEVIATION
ERRORS FOR EARTH'S FIELD RESPONSIVE INSTRUMENTS
Filed Feb. 23, 1956 — 4 Sheets-Sheet 1

INVENTORS
WILLIAM HALPERN
MARLIN C. DEPP
H. A. TRENCHARD
BY Arthur H. Serrell
ATTORNEY

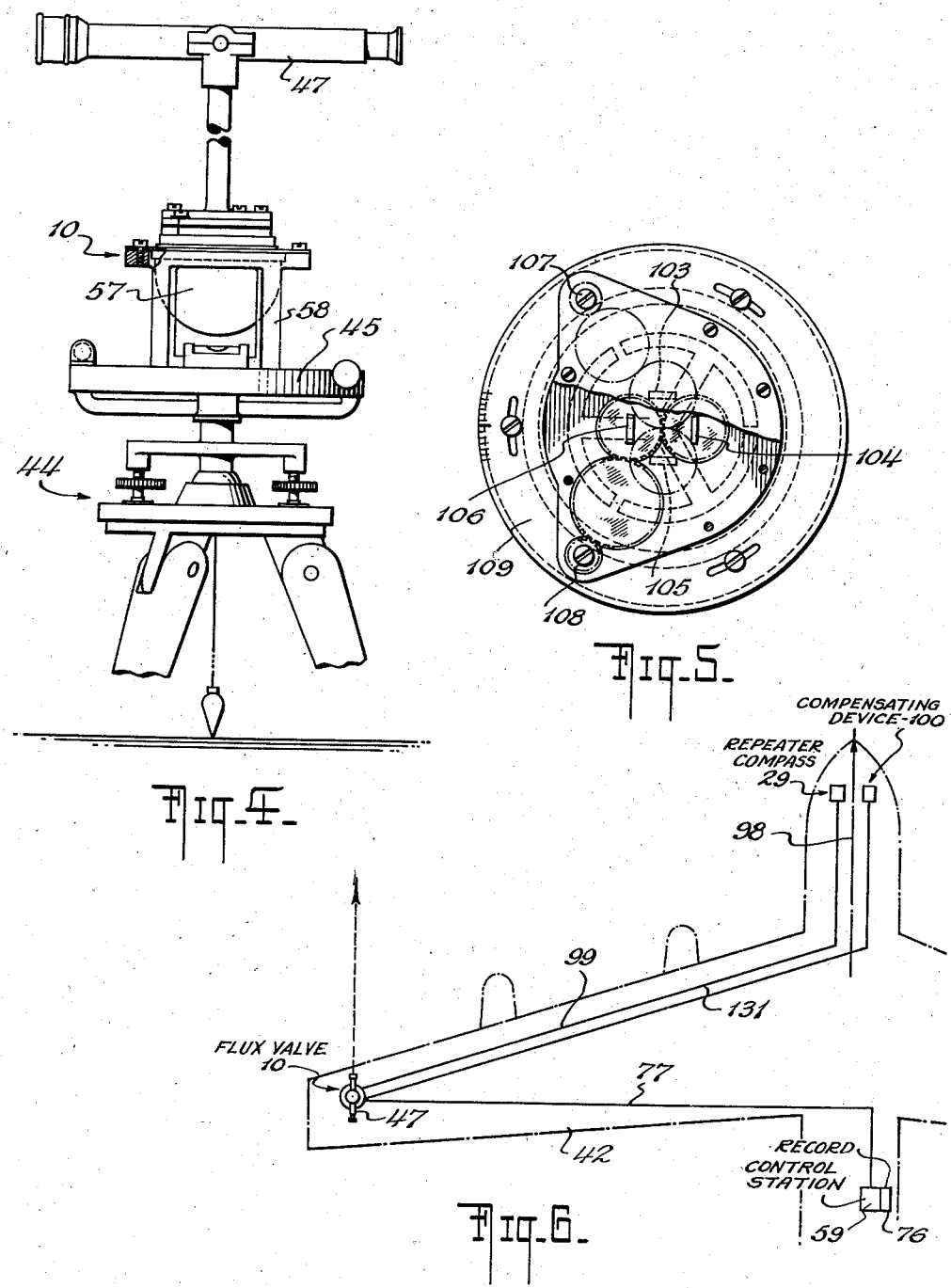

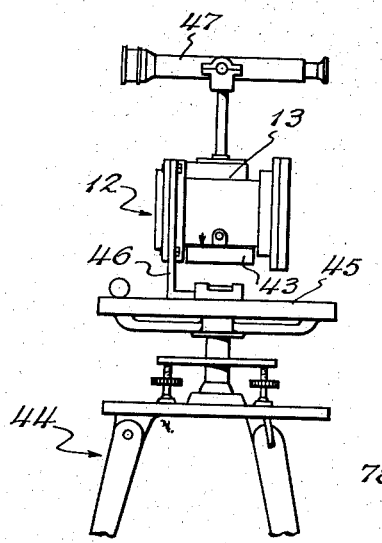
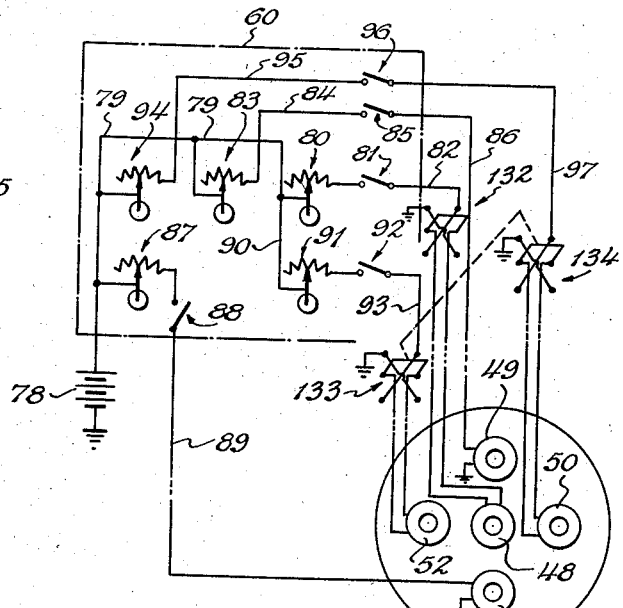

United States Patent Office 2,887,872
Patented May 26, 1959

2,887,872

METHOD OF MEASURING AND COMPENSATING FOR DEVIATION ERRORS FOR EARTH'S FIELD RESPONSIVE INSTRUMENTS

William Halpern, Great Neck, Marlin C. Depp, Peekskill, and Herbert A. Trenchard, Great Neck, N.Y., assignors to Sperry Rand Corporation, a corporation of Delaware Application February 23, 1956, Serial No. 567,203

11 Claims. (Cl. 73—1)

This invention relates to a method of measuring and compensating for deviation errors in compass instruments or systems for dirigible craft of a character that obtain directivity from the horizontal component of the earth's magnetic field. The invention has particular utility in earth's field responsive direct reading compass instruments such as magnetic compasses and flux valve remote reading compass systems of the types shown and described in U.S. Letters Patent 2,357,319, dated September 5, 1944 for Flux Valve Magnetic Compasses and U.S. Letters Patent No. 2,427,654, dated September 23, 1947 for Remote Reading Flux Valve Compass Systems.

Present calibration of such instruments or systems for the noted error necessitates the actual swinging of the craft utilizing the same with reference to the ground to known magnetic headings through an azimuth range of 360 degrees to ascertain the error with sufficient accuracy for navigation purposes. This method is extremely impractical for the compass instruments or systems of such craft as heavy bomber aircraft and large cargo type marine or aircraft. Our improved method is conducted with the compass instrument stationary with respect to the ground in a predetermined direction during the preparation of the electrical ground swinging record. The subsequent swinging procedure is accomplished electrically from the record with the craft either stationary or moving by the creation of a plurality of regulated electromagnetic fields which with the horizontal component of the earth's field provide a number of resultant fields with directivity corresponding to a succession of known azimuth directions.

Deviation is herein defined as the angular difference between magnetic heading and the compass indicated heading of the craft due to local magnetic attraction in the vicinity of the instrument or directional indicating system. Various sources of local attraction carried by a craft of any navigable type, marine, land or air, provide disturbing fields for the directional instruments such as permanently magnetized portions of the body structure of the craft, the engine and associated equipment for moving the craft, general electrical equipment carried by the craft such as power generators, radio transmitters and other obvious devices that operate to provide a magnetic or electric field. The disturbing or hard iron field is fixed to the craft, its resultant direction being dependent on the location of the disturbing sources on the craft and the relative strength of the same. When the craft changes heading through 360 degrees, the disturbing resultant hard iron field moves with it to make a 360 degree rotation with respect to the earth's field. This causes the horizontal component of the total magnetic vector, the sum of the earth's field and the disturbing field, to oscillate with respect to the normal direction of the earth's horizontal field. The noted compass instrument and flux valve systems sense the sum of the fields so that the deviation error goes through one positive maximum and one negative maximum during a 360 degree change in heading. A deviation table or curve for a particular craft is included in the drawings to show how the deviation error changes in the manner described and is dependent on the azimuth direction or heading of the craft at a particular instant. For the accurate navigation of any craft depending on an earth's field sensitive compass instrument, it is necessary to take the deviation error into account and to make the necessary correction for the same either in adjusting the heading of the craft from a deviation table or compensating the instrument for the error through suitable compensating means set to correct the indication of the instrument for the error. The first adjustment is resorted to only in instances where the instruments or systems themselves have no deviation compensating devices included therein.

Compass deviation errors are measured and compensated for by our improved method without the need of physically swinging the craft with respect to the ground to align the same at a number of standard known magnetic headings. The improved method is particularly advantageous with regard to aircraft as the electrical swinging procedure thereof can be conducted with the aircraft either grounded or airborne.

The present invention requires the accurate measurement and reproduction of the horizontal component of the earth's magnetic field in both magnitude and direction. This field is reproduced in accordance with the present inventive concepts by creating an electromagnetic field which allows the resultant horizontal field at the instrument or the flux valve of the system to assume any azimuth direction. This is accomplished in the flux valve systems in the instant case by regulation of the direct currents in the secondary windings of the flux valve through suitable electrical controllers whose settings are recorded to obtain a required electrical ground swinging record. In the case of a magnetic compass, an equivalent result is obtained by the use of a ground swinging coil unit that is connected to the compass instrument while the controllers are manipulated to get the required record. The electrical ground swinging record is made in our improved method with the magnetic compass or flux valve element of the system apart from the craft in which the same are to be used. Electrical ground swinging operations can be practiced when desired in an in-flight aircraft wherein it is necessary to maintain a fixed course during the procedure.

Other advantages and practices of our improved method will become apparent in the following detailed description of the subject invention in relation to the accompanying drawings, wherein Fig. 1 is a schematic view and wiring diagram of a flux valve compass system in which the indicator is controlled by a slaved directional gyro showing the electrical controllers constituting one of the control stations for the electrical ground swinging operation and the type of compensating controllers for the system that introduce direct currents to the secondary windings of the flux valve component;

Fig. 4 is a side elevation of a composite arrangement including transit, flux valve and sighting device parts that may be utilized in the orienting, the electrical ground swinging record making, and locating steps of our improved method;

Fig. 5 is a detail plan view of a magnetic compensator unit such as may be utilized in connection with a flux valve system to provide the deviation compensation;

Fig. 6 depicts a pictorial representation of the components employed in the practice of our improved method showing a possible arrangement of the same in an aircraft;

Fig. 7 is a perspective view of a conventional magnetic compass with a portion of its housing cut away showing an electrical ground swinging coil unit connected thereto;

Fig. 8 is a view similar to Fig. 4 in which the coil unit and magnetic compass take the place of the flux valve on the transit structure, and Fig. 9 is a circuit diagram showing the connections between the coil unit as employed in the magnetic compass and the potentiometers and switches constituting the electrical controllers of a modified type of control station for the system.

Figure 1:
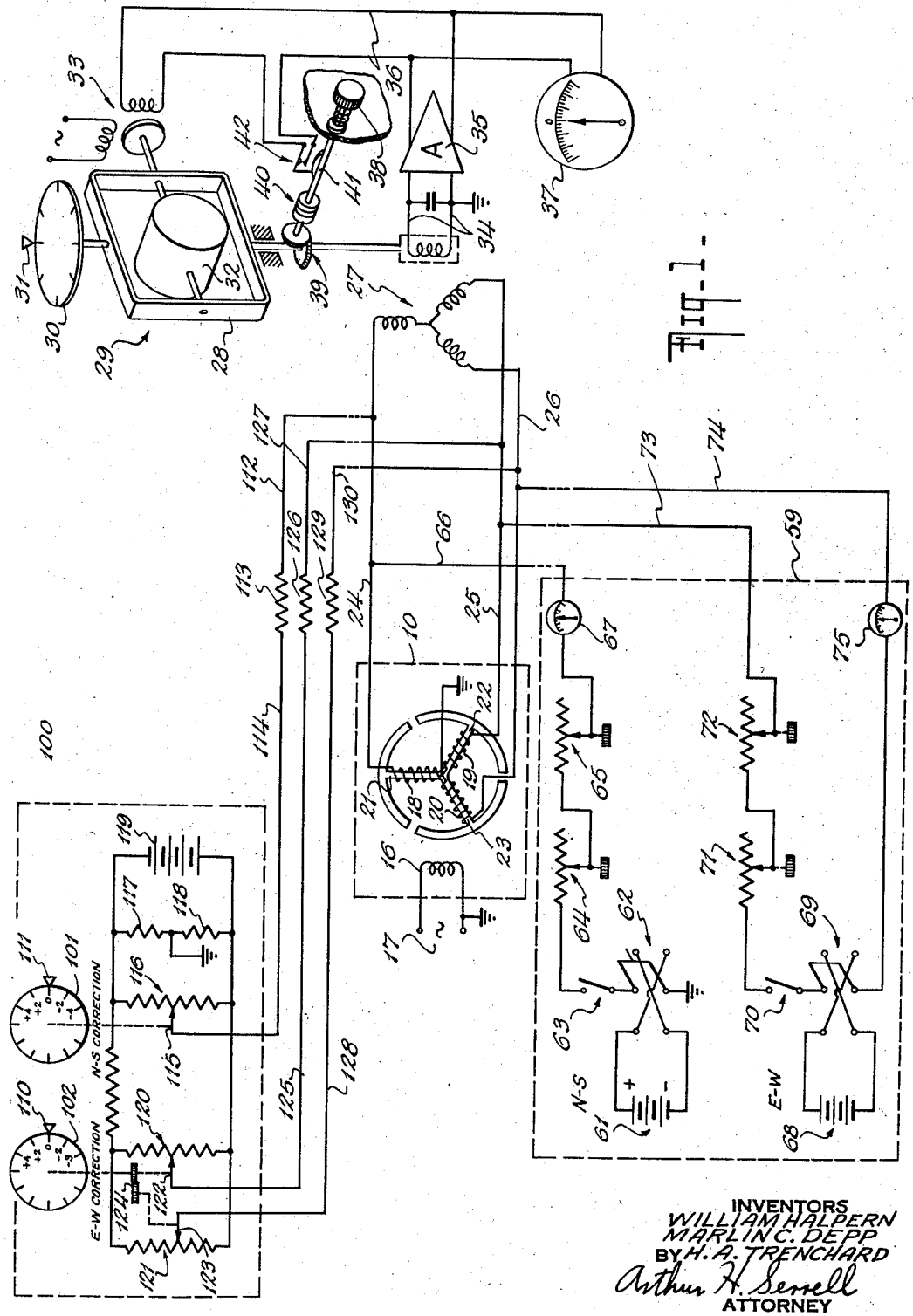

Our improved method is useful both in deviation error determination and compensation of compass instruments or systems whose directivity is obtained from the horizontal component of the earth's magnetic field. The sensitive elements of such systems or instruments may take the form of a flux valve 10, Fig. 1, of the character shown and described in U. S. Letters Patent 2,383,460, dated August 28, 1945 for Magnetic Field Responsive Devices or the compass card part 11 of a conventional type of magnetic compass 12 as shown in Fig. 7. Card part 11 of the magnetic compass instrument 12 is a float element with attached permanent magnets (not shown) that is contained within a fluid filled housing 13 having a window portion 14 through which the card is observed. The side reading card shown in Fig. 7, is observed with reference to a lubber line (not shown) situated on the window portion 14 in determining the heading of the craft on which the instrument is mounted. A suitable instrument panel mounting rim part of which is shown in Fig. 7 serves to interconnect the housing 13 of the conventional magnetic compass instrument and the craft on which it is located.

Deviation compensation of the sensitive card part 11 of the magnetic compass 12 may be provided through the influence of a pair of settable small permanent magnets one of which is indicated at 15 in Fig. 7. This conventional type of compass compensator is located in a secondary housing above the fluid filled housing 13 of the compass in a position to modify the effect of the earth's field on the magnets of the compass card part 11. The compensating magnets as shown in connection with magnet 15 are angularly adjustable about a vertical axis through a suitable gear train and a shaft whose slotted end extends to the front face of the instrument housing 13. A suitable scale and index arrangement (not shown) respectively contained on the face of the instrument and shaft show the extent and polarity of the compensating adjustment. Until the determination of the deviation error in accordance with the practices of the improved method, the compensating devices utilized in the compass systems or instruments such as constituted in part by permanent magnet 15 are set in a non-correcting condition.

The sensitive element of the compass system shown in Fig. 1 is in the form of a three legged flux valve 10. As depicted, the primary coil 16 of the valve 10 is energized from a suitable source of alternating current electrical energy 17. The secondary coils 18, 19 and 20 on the respective equiangularly spaced flux conducting legs 21, 22 and 23 of the valve provide a controlling output dependent on its position in azimuth in the earth's magnetic field by way of leads 24, 25 and 26. The receiver for the controlling or slaving flux valve output signal shown in Fig. 1 is a compass card driving remotely located repeater of the type shown and described in U.S. Letters Patent 2,357,319, dated September 5, 1944 for Flux Valve Magnetic Compasses. The remotely located repeater in the structure shown includes a comparator element 27 whose electrical rotor part is connected to an extension of the lower trunnion of a gimbal ring 28 of a slaved directional gyro 29. The upper trunnion of ring 28 supports or drives a compass card indicating element 30 that is read in relation to a lubber line or index 31 fixed to the craft. The directional gyro 29 includes a rotor case 32 that is torqued about its horizontal axis of support in ring 28 by a suitable torque motor 33. The control winding of the torque motor 33 of the system is energized by the output of the rotor of the comparator 37 by way of leads 34, amplifier 35 and leads 36 so as to normally precess the rotor case 32 about its ring axis until a null signal is obtained from the rotor of the comparator. The output of the valve 10 fed the stator of the comparator 27 by way of leads 24, 25 and 26 accordingly slaves the directional gyro 29 so that the card 30 of the system is readable on index 31 to provide an indication of the course of the craft utilizing the system. A zero center null meter 37 may be included in the system to provide an indication of the output of the comparator 27. As shown, meter 37 is also operated by the output of amplifier 35 by way of leads 36. Proper corrective setting of the valve and repeater elements of the described compass system may be effected by manual manipulation of a slide and turn knob 38 that may be mechanically connected to the ring 28 through suitable bevel gears 39, clutch 40 and shafting 41. A normally closed switch 42 in the input circuit to motor 33 constituted by leads 36 is opened by manipulation of knob 38 so that the supply of energy from amplifier 35 to the torque motor 33 is temporarily broken. The rotor of the comparator 27 can then be turned by the knob 38 to obtain the necessary correction to bring the pointer of the null meter 37 to zero.

The initial mounting of the compass instrument shown in Fig. 7 or flux valve element 10 of the compass system shown in Fig. 1 in the craft to utilize the same may constitute the locating step in our improved method. In this connection, as depicted in Fig. 6, the flux valve 10 of the compass system may be fixedly located in a suitable position in one of the wings of an aircraft 42. Advantageously, the valve is located in the craft at a position therein that is most remote from sources causing deviation error. Aircraft 42 shown in Fig. 6 is illustrative of any type of navigable craft requiring directional information. Magnetic compasses of the type shown in Fig. 7 are direct reading instruments. This type of instrument is located on the craft in the most advantageous position possible with respect to deviation causing sources and where it can be directly observed by an operator. In an aircraft, the magnetic compass is generally located on the instrument panel directly in front of the pilot.

The initial step in our improved method is conducted with the compass system or instrument apart from the craft in which the same is to be utilized, being conducted in an open field location, such as at an airport, that is as far removed as possible from any local magnetic disturbances of its own. Any region of minimum magnetic disturbance into which the craft may be conveniently moved is useful for this purpose. Accordingly, the locale in which the method is conducted may be considered substantially free of any outside magnetic disturbances.

The first step in the procedure is necessary in order to obtain the required electrical ground swinging record. As applied to the compass instrument of Fig. 7, this consists in orienting the magnetic compass connected to a unit 43 with a plurality of electrical ground swinging coils, apart from the craft to utilize the compass in a predetermined direction in the earth's magnetic field with the deviation compensator of the compass set in a non-correcting condition. The orientation step may be accomplished with the use of a transit instrument 44 shown in Fig. 8. As shown, the compass instrument housing 13 is fixedly connected to the level turntable 45 of transit 44 by means of a mounting bracket 46. The sighting piece 47 of the transit is suitably secured to the top of the compass housing. Transit 44 is located in the test region along a line of sight with a distant object that corresponds with a predetermined and preferably northerly direction in the earth's magnetic field, the direction being with respect to transit. The compass instrument is oriented in the earth's magnetic field by adjustably turning the compass housing 13 and the connected sighting device 47 to sight the distant object. When so oriented, the compass is suitably locked in position on the transit.

The orienting step described may be conducted with the coil unit 43 shown in Fig. 7 connected to the bottom of the housing 13 of the compass. As depicted in Fig. 9, unit 43 may consist of a housing with a central vertically disposed coil 48 and four equiangularly disposed coils 49, 50, 51 and 52. The coil unit 43 is located on the compass housing 13 with the axis of the central fixed coil 48 in alignment with the vertical pivot post supporting the card part 11 or sensitive element of the compass. Two of the oppositely paired coils, for example, fixed coils 49 and 51 of the coil unit 43, are arranged on the compass housing 13 with their centers symmetrically disposed in the coil unit 43 and with their axes in an angular relationship in a vertical plane containing the axis of coil 48 and containing the line of sight of sighting device 47. The fields created by energization of coils 49 and 51 are accordingly parallel in direction to the earth's magnetic field. The other oppositely paired fixed coils 50 and 52 are situated with the vertical plane containing their axes in perpendicular relation to the vertical plane containing the axes of coils 49 and 51 and provide fields when energized that are athwartship to the earth's magnetic field. As shown in Fig. 7, the housing of the coil unit 43 is secured in a removable stationary position to the bottom of the compass housing 13 by spring clip means such as indicated at 53 on the housing 13 whose extending fingers engage the underside of a flange 54 of the housing of the coil unit 43. To provide correct orientation of the compass and coil unit housing parts as described, the respective parts are connected with the alignment indicia for the respective parts indicated at 55, 56 in contiguous relation. The provided arrangement of coil unit 43 and the sensitive card element 11 of the compass is such as to enable the element 11 to be moved through a range of 360 degrees under the influence of the fields created upon energization of the coil unit. In the practice of the improved method where the compass instrument is already mounted in the craft and the electrical ground swinging record has already been made, the craft with the compass therein is positioned in a predetermined direction in the earth's magnetic field such as north and the coil unit 43 is attached in oriented condition to the compass housing as herein represented prior to the electrical ground swinging step of the procedure as hereinafter described. As indicated in Fig. 8, compass housing 13, sensitive card element 11 and coil unit 43 are correctly located with respect to the earth's magnetic field to satisfy the conditions required for the initial orienting step of the total procedure.

For the remote indicating type compass or flux valve compass system shown in Fig. 1, the corresponding step of the procedure consists in orienting the flux valve sensitive element 10 of the compass system in a predetermined direction preferably north in the earth's magnetic field with the deviation compensator, if any, set in a non-correcting condition. In this instance, as shown in Fig. 4, the flux valve 10 takes the place of the magnetic compass housing 13 on the transit 44 described in connection with Fig. 8. The housing 57 of flux valve 10 is mounted on the turntable 45 of the transit by means of a suitable connecting bracket 58. The sighting device 47 of the transit is connected to the flux valve housing 57 in alignment with one of the secondary coils or legs of the valve for example, coil 18 and leg 21. Adjustment of the sighting device until directed on the distant object as previously described orients the flux valve 10 properly in relation to the earth's magnetic field. The turntable 45 of the transit is then suitably locked to maintain the correct orientation of the flux valve. It will be understood, that the transit 44 with the flux valve thereon is located in a test region meeting the requirements hereinbefore set forth.

The next step in the overall procedure is also conducted without the presence of the craft and consists in electrically swinging the oriented flux valve 10 or the equivalent magnetic compass 12 and coil unit 43 over a range of 360 degrees through a succession of azimuth directions observed on the respective indicators of the noted devices. For the flux valve as shown in Figs. 1 and 6, the swinging operation is effected from a control station indicated at 59 that is represented as located within the aircraft 42 at a location remote from the flux valve 10. In the record make step of the method, the indicated station 59 is removed from the craft and located at a point remote from the flux valve element of the compass system situated on the transit 44. A different control station is shown in Fig. 9 as indicated at 60 for the combination magnetic compass and connected coil unit 43. It will be understood that station 60 is located at a distance from the oriented compass housing and connected coil unit 43 on the transit shown in Fig. 8.

In the compass system, the electrical swinging is accomplished by introducing direct currents to the secondary windings of the flux valve through a number of settable electrical controllers at the control station 59 to provide a directive field equivalent to the earth's field for each of a plurality of azimuth directions observed on the compass card of the system. This requires two operators that cooperate through means of a suitable intercommunication system (not shown), one of the operators being located at the control station 59 and the other being located to observe the compass card indicator 30 and index 31. As shown in Fig. 1, the panel of the control station 59 includes a number of settable electrical controllers that determine the magnitude and polarity of the direct current supplied from the station to the windings of the flux valve element 10 of the compass system. As shown in Fig. 1, direct current is supplied to the northerly directed secondary winding 18 of flux valve by way of an input circuit including a battery 61, a polarity reversing switch 62, an off-on switch 63, coarse and fine potentiometers 64, 65 and lead 66 connected to the flux valve lead 24. An ammeter 67 may be included in this circuit. Windings 19 and 20 of the valve are likewise supplied with direct current by a further input circuit including a battery 68, a polarity reversing switch 69, and off-on switch 70, coarse and fine potentiometers 71, 72, lead 73 to flux valve lead 25 and lead 74 interconnecting the flux valve lead 26 and one of the middle terminals of the reversing switch 69. A further ammeter 75 may be included in this circuit. The electrical controllers of control station 59 whose settings are recorded in a control record 76 shown in Fig. 6 as located at the station are provided by the designated switches 62, 63, 69, 70, and the potentiometers 64, 65, 71, 72. The indications of the ammeters 67 and 75 may also be included as part of the record.

In this step of the method, the operator at the control station 59 makes the necessary controller adjustments and the other of the operators observes the readings of the compass card 30 on index 31. The swinging is accomplished by introducing direct currents to the windings of the flux valve to provide a directive field equivalent to the earth's field for each of the directions observed on the compass indicator. Such fields are the vector resultants of the earth's field in the oriented condition of the valve 10 on transit 44 and an electrical ground swinging field created at and by the windings of the valve by the currents introduced therein by the respective electrical controllers at the control station 59. By changing the magnitudes and polarities of the electrical ground swinging field by adjustment and setting of the respective controllers, the resultant directive field to which the valve is responsive is moved over a range of 360 degrees through a succession of azimuth directions as observed by the operator at the compass indicator. As an example, in this connection, in order to obtain a southerly reading from compass card 30 on index 31, it is necessary to produce an electrical ground swinging field that is opposite in direction to the earth's magnetic field and twice the magnitude of the earth's field. This is accomplished by the operator at the control station 59 in setting switch 70 in an open condition to eliminate any electrical ground swinging field athwartship to the earth's field, in closing switches 62 and 63 and in adjusting potentiometers 64 and 65 so that the current in winding 18 is of correct polarity and magnitude to obtain the desired result. As the described swinging procedure occurs, the operator at control station 59 makes a record of the settings of the controllers for each of the directions observed by the second operator. For a particular valve or compass instrument it is only necessary to make the described electrical ground swinging record once. Thereafter, when the valve or compass instrument is installed in the craft, the record is referred to in order to reproduce the electrical swinging field in the determination of compass deviation errors. Athwartship directing fields are obtained by opening switch 63, closing switches 69 and 70, and adjusting the potentiometers 71 and 72. As the station 59 is relatively remote from the flux valve 10, the connecting leads 66, 73 and 64 are contained in a shielded cable as indicated at 77 in Fig. 6.

Control station 60, Fig. 9, functions in the same manner as the described station 59 in its influence on the coil unit 43 and magnetic compass 12. In this instance, in the swinging operation, the second operator observes the indications of the compass card sensitive element on the lubber line of the compass instrument. He accordingly is stationed at the transit 44. The control station 60 is located at a distance from the transit 44. As shown in Fig. 9, the settable controllers of the control station 60 are provided on a suitable control panel and include a switch and potentiometer in series relation in an input circuit to each of the coils of the coil unit 43. The grounded central coil 48 is energized from battery 78 by way of lead 79, potentiometer 80, switch 81, lead 82 and reversible switch 132. The north-south directed coil 49 is likewise energized from battery 78 by way of lead 79, potentiometer 83, lead 84, switch 85 and lead 86. The opposite polarity coil 51 is energized by way of potentiometer 87, switch 88 and lead 89, from the battery 78. The athwartship located coil 52 is energized from battery 78 by way of lead 79, lead 90 connected to lead 79, potentiometer 91, switch 92, lead 93, and reversible switch 133. Grounded coil 50 of opposite polarity to coil 52 is energized from battery 78 by way of lead 79, potentiometer 94, lead 95, switch 96, lead 97 and reversible switch 134. A ground connection is provided for each of the coils 48, 49, 50, 51 and 52 as well as the battery 78. Reversible switch 132 provides for reversal of the direction of the magnetic field established by coil 48 in order to compensate for possible small imperfections in the physical geometry of the coil unit 43. The ganged reversing switch 133 and 134 for coils 52 and 50 provide directivity of the athwartship field to both easterly and westerly directions. The leads 89, 93, 82, 86 and 97 interconnecting the control station 60 and the unit 43 connected to the compass 12 are contained within a shielded cable of sufficient length as to permit the station to be relatively remote from the location of the transit 44. The operator at station 60 adjusts the electrical controllers thereat constituted by potentiometers 94, 83, 80, 91 and 87 and switches 96, 85, 81, 92, 88, 132, 133 and 134, in the electrical ground swinging procedure to move the compass card sensitive element 11 of the stationary compass 12 through a succession of azimuth directions over its range of 360 degrees. The observer at the transit cooperates with the operator at the control station 60 through a suitable intercommunication system in checking the readings of the card element 11 of the compass during the swinging procedure. The sequence or continuity of the compass positions observed by the operators in the swinging procedure is not material.

As the swinging procedure occurs, the operator at control station 59 or 60 makes a record of the settings of the respective electrical controllers on the record chart such as indicated at 76 in Fig. 6. This is necessary in order to have a permanent record that can thereafter be referred to, to reproduce the electrical ground swinging fields both in magnitude and direction and thereby obtain the necessary directive fields for either flux valve 10 or sensitive element 11 of the magnetic compass 12. Making a record of the setting of the controllers of the control stations for each of the observed azimuth directions of the stationary flux valve or magnetic compass accordingly constitutes the step of the method following the electrical ground swinging step. The record is made in the manner described under conditions where the compass instrument or system is apart from the craft in which the same is to be used.

The system is adjustable to eliminate flux valve cross talk errors which may be defined as errors due to the creation of magnetic fields normal to the desired direction when currents are established in the coils of the flux valve. This error is due to non-symmetrical physical arrangements and non-symmetrical magnetic coupling of the flux valve coils 18, 19 and 20. As an example, if the current in coil 18 of the valve shown in Fig. 1 should produce an E—W component field, this component would add to or subtract from the component produced by the current in coil windings 19 and 20. The magnitude and direction of the resultant vector field $H_R$ would be in error. The cross talk error is eliminated by the adjustment of potentiometers 71, 72 such that the E—W field produced by the coils 19 and 20 is reduced or increased by an amount equal to the cross talk from winding 18. In a similar manner, the cross talk due to current in coils 19 and 20 can be compensated for by adjustment of the current in coil winding 18.

In the next step of the overall procedure, the craft such as aircraft 42, Fig. 6, is wheeled or otherwise moved to the test location. The craft is positioned in the location with its longitudinal axis 98 in the oriented condition of the flux valve 10 or magnetic compass 12 previously described in the earth's magnetic field. Orientation of the craft may be accomplished by means of a transit that is directed on the remote object referred to in connection with the orienting step of the procedure or in any other suitable manner. The craft is preferably but not necessarily positioned so that the portion of the same at which the flux valve 10 or compass instrument 12 is to be permanently mounted lies in the vertical plane that the flux valve 10 or compass instrument 12 has been oriented in. This condition where the flux valve element of the compass system is located in the wing tip of the aircraft 42 is shown in Fig. 6. With the compass system of Fig. 1, the next step in the procedure accordingly consists in locating the system in the craft with the flux valve thereof in its oriented predetermined direction in the earth's magnetic field. In accomplishing this step, the housing 57 of the flux valve is removed from the bracket 58 on the transit 44 and is permanently mounted in the craft in the location specified with the sighting device 49 thereon directed on the distant object. After the mounting or locating step is completed, the sighting device is removed from the top of the housing of the flux valve. As shown in Fig. 6, the repeater compass or directional gyro receiver 29 for the flux valve is mounted on the instrument panel of the craft where the same is readily observed by the pilot. Leads 24, 25 and 26 interconnecting the valve and repeater element of the system are contained in a shielded cable indicated at 99 in Fig. 6.

In relation to the compass 12 shown in Fig. 7, the locating step is conducted in like fashion to that described with the exception that both the compass housing 13 and coil unit are mounted in a suitable location in the craft in their oriented condition in the earth's field.

Figure 2:
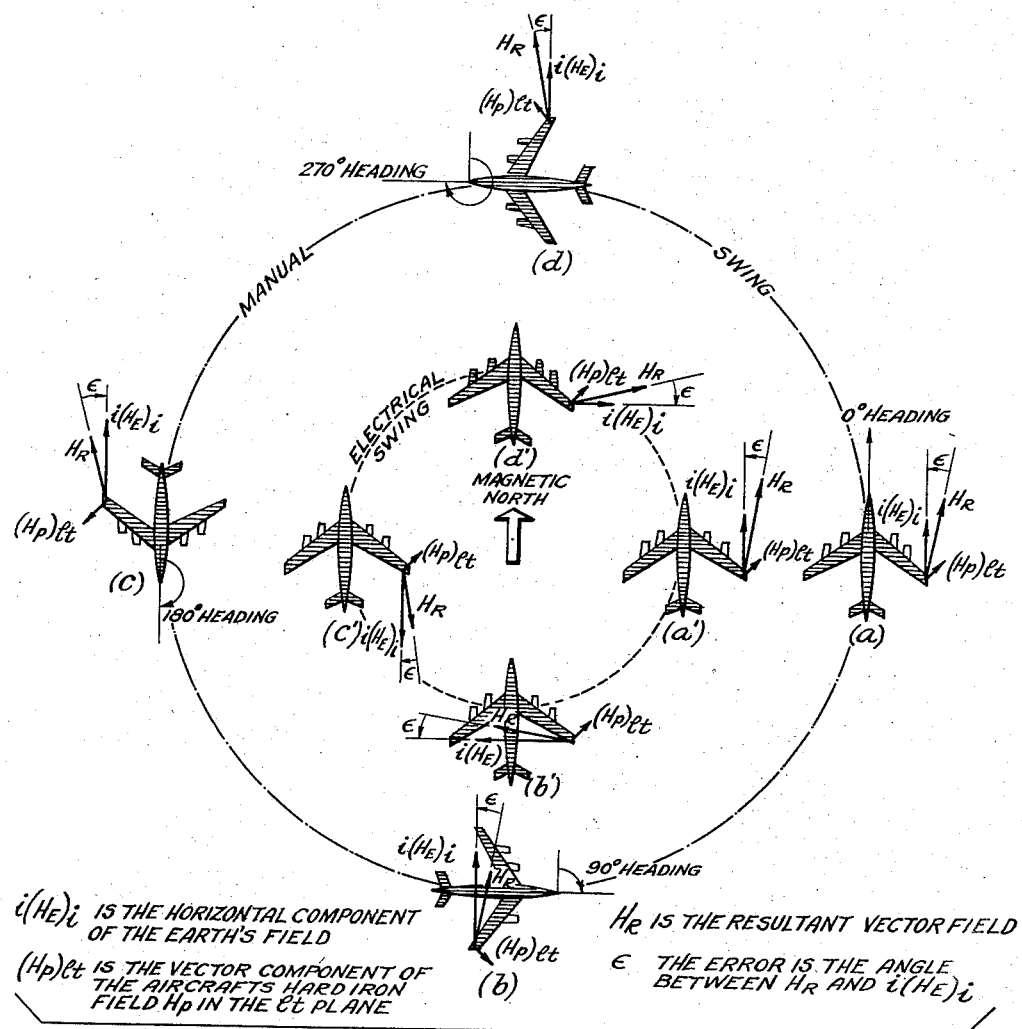
Fig. 2 is a combination graphic and vector diagram comparing an electrical ground swinging procedure with an actual ground swinging procedure in explanation of the theory of our improved method.

Reference is now made to Fig. 2 in connection with the actual electrical ground swinging procedure step of our improved method. This step consists in electrically ground swinging the craft in accordance with the controller record 76 by changing the settings of the controllers 10 to reproduce the directive fields corresponding to each of the observed azimuth direction. This step may occur as shown in Fig. 6 with the control station 59 and record 76 inboard the craft. The step may furthermore be conducted with the craft in a grounded, stationary condition as shown or with the craft in flight and headed in the predetermined northerly direction. In the last event, a reference apart from the system or compass must be utilized to maintain the craft in its oriented heading until the electrical ground swinging procedure is completed. The control station 59 or 60 whether inboard the craft or not is located at a distance from the flux valve or magnetic compass and coil unit 43.

The theoretical basis for the electrical ground swinging technique is represented in Fig. 2. In this figure, the small vector designated $(Hp)lt$ is indicative of the direction and magnitude of the permanent field of the craft's iron at the flux valve or magnetic compass. This field is the deviation causing field introduced in the system by the inclusion of the craft therein. The magnitude and direction of the field represented by the illustrative vector $(Hp)lt$ are determined by the combined effect of the various sources of local attraction carried by the craft as hereinbefore set forth. As represented in the outside circle of this figure depicting a manual swinging procedure, the directivity of the disturbing permanent field $(Hp)lt$ changes with change in the azimuth position of craft and compass in relation to magnetic north as depicted by positions labeled $(a)$, $(b)$, $(c)$, and $(d)$. In a ground rotation of the craft, the permanent disturbing field, the flux valve and compass housing move together in relation to the earth's magnetic field as depicted by the arrow marked magnetic north. It is noted however that from the four headings depicted namely 0, 90, 180 and 270 degrees, the direction and magnitude of the disturbing field $(Hp)lt$ remains constant with respect to the craft.

As located in accordance with the teaching of the present invention, the craft 42, flux valve 10 and magnetic compass 12 are oriented in the earth's magnetic field as represented at the 0 degree heading position of the craft in Fig. 2. The disturbing field represented by the vector $(Hp)lt$ corresponds to the permanent error field for the given aircraft and its direction and magnitude as vectorially presented are arbitrarily selected for purposes of explanation of the swinging procedure.

Figure 3:
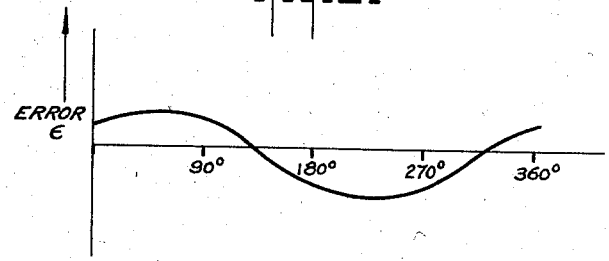
Fig. 3 is a representative deviation curve or table that in the chosen example indicates a positive maximum deviation error of the system at about 60 degrees heading and a negative maximum deviation error at about 225 degrees heading.

The card 30 or 11 observed by the operator on the craft will always indicate a direction corresponding to the resultant field at the flux valve or sensitive element of the magnetic compass. This field is represented in Fig. 2 as the resultant field vector $(H_R)$ being the vectorial combination of the earth's field vector $(i(He)_i)$ and the permanent field vector $(Hp)lt$. The angle $(\epsilon)$ shown in Fig. 2 represents the angular deviation of the compass reading from north, 0 degree heading of the craft, which is positive in the example chosen for illustration. If the craft is now rotated in azimuth manually from its initial 0 degree orientation and the difference between the compass indication and the true magnetic heading plotted, a deviation error table or curve such as shown in Fig. 3 will result. In the example selected, a single cycle error will appear with a positive deviation error being observed on approximate north headings and a negative deviation error being observed on approximate south headings. A representative deviation curve is shown in Fig. 3 in which the magnitude and sense of the deviation errors are depicted for the particular craft. The relation between the deviation error and the heading of the craft is clearly illustrated thereon. In the outside circle in Fig. 2 designated manual swinging, the craft is shown in comparative 90, 180 and 270 headings with the respective vectors applied thereto. As demonstrated therein, the earth's field vector $i(He)_1$ maintains its direction while the other vectors move in relation to it with the craft as the craft changes heading. The vectors in this circle with the craft at 180 degree heading shows the deviation angle $(\epsilon)$ to be negative in character.

Instead of manually swinging the craft as depicted in the outside circle in Fig. 2, the swinging in the improved procedure is accomplished electrically with the craft remaining on its 0 degree or oriented heading. This is shown in the inside circle of Fig. 2 represented as electrical swing where the positions for the respective headings 0, 90, 180 and 270 of the craft, as depicted at $(a')$, $(b')$, $(c')$, and $(d')$, remain unchanged with respect to magnetic north. This type of swinging is accomplished by reproducing the directive field contained on the record so that for the 90 heading, the equivalent earth's field is shown by the magnitude and direction of the westwardly pointed vector $i(He)_1$. For the 180 heading, the vector $i(He)_1$ is pointed south and is equal and opposite to the earth's field vector in the manual swing procedure. At 270 degree heading, the electrical ground swinging vector $i(He)_1$ is pointed eastwardly. By the arrangements provided, the electrical ground swinging field is localized to the area of the flux valve or magnetic compass. The entire craft remains subject to the earth's field as initially oriented and the magnitude and direction of the disturbing permanent field $(Hp)lt$ remains as shown for the 0 degree heading in Fig. 2 throughout the procedure. The resultant field vector $(H_R)$ and the angle $(\epsilon)$ are identical in magnitude and sense to the same factors as represented at the 90, 180 and 270 degrees headings of the craft in the illustrated manual swing procedure. In the electrical ground swinging operation, the earth's field is, in effect, turned through a 360 degree rotation. Accordingly, by varying the direction and magnitude of the electrical ground swinging field in the manner described herein and illustrated in Fig. 2, the craft is electrically ground swung about magnetic north.

An operator at either of the control stations 59 or 60 effects the electrical ground swinging operation by changing the settings of the controllers at the respective stations in accordance with the controller record or chart 76. This reproduces the directive fields corresponding to each of the azimuth directions observed in setting up the record. This step of the procedure accordingly consists in electrically ground swinging the craft in accordance with the controller record by changing the settings of the controllers of the control station to reproduce the directive fields corresponding to each of the azimuth directions observed on card 30 or card sensitive element 11.

The reproduced fields effective locally at the valve 10 and compass 12 result in movement of the card 30 and compass card part 11 as the fixedly headed craft is electrically ground swung. As the operation takes place, the operator at the receiver of the system or magnetic compass observes the error in the heading of the craft for each of the respective observed directions contained on the record 76. The angle is shown by the angle $(\epsilon)$ in Fig. 2. The intercommunication system between the operators enables either operator to make a record of the error angle $(\epsilon)$ observed which is due to the disturbing permanent field of the craft as represented by the vector $(Hp)lt$ in Fig. 2. An illustrative record of this character is shown by the deviation curve of Fig. 3. Where the system does not include a deviation compensator such as shown in Fig. 7, the preparation of such a deviation table, curve or chart may be considered the last step of the improved method.

Where as provided in Fig. 7, the compass includes a deviation compensator, the final step in the overall method consists in setting the deviation compensator in accordance with the deviation curve or record of the observed deviation errors. This is accomplished in the type of compensator shown in Fig. 7 by a screw driver adjustment of the magnets constituting the compensator.

For a given test location of coil unit 43 or flux valve 10 with its respective control station, it will be understood that in practicing the improved method either to measure or correct for deviation errors, it is unnecessary to repeat the steps herein described in preparing the electrical ground swinging chart 76 or in remounting the system or compass in the craft. With the compass devices on the craft, the first step of the procedure would accordingly consist in positioning the craft with the field responsive element of the compass in a predetermined direction in the earth's field. Specifically, as applied to magnetic compasses a further step requires the orientation of a unit 43 with a plurality of electrical ground swinging coils thereon on the compass. With the craft oriented, this orientation consists in connecting the unit 43 to the compass housing 13 with the respective indicia 55 of the compass and 56 of the unit in alignment. With the record 76 prepared, the swinging step accordingly consists in creating by control from a station spaced from the field responsive element of the compass a plurality of regulated electromagnetic fields at the field responsive compass element which with the horizontal component of the earth's magnetic field at the predetermined position of the craft provide a number of resultant fields with directivity corresponding to a succession of known azimuth directions over a range of 360 degrees.

With reference to the compass system form of the invention shown in Fig. 1, the deviation compensator indicated at 100 functions through a pair of settable controllers or error corrector knobs 101 and 102 to introduce direct current to the secondary windings 18, 19 and 20 of the flux valve 10 of the system. Such a compensating system is shown and described in detail in U.S. Patent 2,852,859 issued September 23, 1958. More conventional compensating devices for a flux valve may consist of a number of small permanent bar magnets 103, 104, 105 and 106 as shown in Fig. 5 whose relative paired positions in azimuth can be changed by rotating two set screws 107, 108 from the outside of the device. The compensating magnets 103, 104, 105 and 106 are located in the vicinity of the valve 10 and may be incorporated in the same structure as the valve or an independent housing 109 that may be suitably attached to the valve housing 57. As shown in Fig. 5, suitable gear trains interconnect opposite pairs of the compensating magnets to the respective set screw adjusting element. Suitable scales are included on the housing 109 of the device that are read in connection with the respective screws 107, 108 to indicate the sense and degree of the corrective setting. Because of the location of the valves 10 in the craft, the noted conventional compensating devices which are correspondingly located may be difficult to adjust or set. The remote compensator 100 shown in Fig. 6 is advantageous in the fact that it is distant from the valve 10 and the adjustable knobs 101, 102 thereof are readily accessible to the operator in the cabin of the craft 42. The E—W correction knob 102 is calibrated as indicated in Fig. 1 with respect to fixed index 110. The N—S correction knob 101 is calibrated as indicated with respect to fixed index 111. In the zero settings of the knobs 101 and 102, the output of the compensator 100 is null.

The magnetic fields at the valve 10 required for a desired compensation are obtained by proper adjustment of the magnitude and polarity of direct current from the compensator 100. As shown in Fig. 1, secondary coil 18 of the valve 10 may be supplied with compensating current by way of lead 24, connecting lead 112, resistor 113 and lead 114 to the slider arm 115 of a potentiometer 116. With the slider 115 set for zero output by knob 101, the potentiometer 116 is located in a balanced bridge circuit with resistors 117 and 118 that is energized by battery 119. Movement of the N—S knob 101 in a clockwise or counterclockwise direction unbalances the bridge and determines the magnitude and polarity of the compensating current supplied the coil 18 by way of lead 114, resistor 113, lead 112 and lead 24. Potentiometers 120 and 121 are similar to potentiometer 116. The sliders 122 and 123 of the respective potentiometers 120 and 121 are moved differentially by the knob 102 through a reversing gear connection 124. Movement of the E—W correction knob 102 accordingly unbalances the respective bridges including potentiometers 120 and 121 differentially so that the outputs thereof are of different polarities although of corresponding magnitudes. The compensating current from the error corrector 100 from slider 122 is fed the secondary coil 19 of the flux valve 10 by way of lead 125, resistor 126, and lead 127 to lead 25. Current of the opposite polarity from slider 123 is fed the secondary coil 20 of the valves 10 by way of lead 128, resistor 129 and lead 130 to lead 26. Resistors 113, 126 and 129 serve the purpose of isolating the compensator 100 from the flux valve and repeater elements of the system shown in Fig. 1. As shown in Fig. 6, the leads interconnecting the compensator 100 and valve 10 are contained in a shielded cable 131. The deviation errors in the flux valve compass system form of the invention are corrected by adjusting the magnitude and polarity of a supply of direct current to the secondary windings of the valve.

This application contains certain features common to copending application Serial No. 567,204, filed February 23, 1956, for Method of Measuring and Compensating for Deviation Errors in Earth's Field Sensitive Direction Indicators in the names of Halpern, Depp and Fragola and assigned to the same assignee as this application; this related application issuing concurrently herewith.

Since many changes could be made in the elements utilized in the improved method and many apparently widely different embodiments of this invention could be made without departing from the scope thereof, it is intended that all matter contained in the above description or shown in the accompanying drawings shall be interpreted as illustrative and not in a limited sense.

What is claimed is:

1. A method of correcting for deviation errors in a magnetic compass with a settable deviation compensator which consists in positioning a stationary craft with the compass therein in a predetermined direction in the earth's magnetic field with the deviation compensator set in a noncorrecting condition, orienting in accordance with the predetermined direction a stationary unit with a plurality of fixed electrical ground swinging coils in the field of the compass, energizing the fixed coils of the stationary unit from a control station spaced from the compass to create a plurality of regulated, electromagnetic fields at the compass which with the horizontal component of the earth's magnetic field at the directed position of the craft provide a number of resultant fields with directivity corresponding to a succession of known azimuth directions over a range of 360 degrees, observing the error in the indicated heading for each of the respective known azimuth directions on the card of the magnetic compass, and setting the deviation compensator in accordance with the observed errors to correct the compass.

2. A method of measuring deviation errors in a magnetic compass which consists in positioning a stationary craft with the compass therein in a predetermined direction in the earth's magnetic field, orienting in accordance with the predetermined direction a stationary unit with a plurality of fixed electrical ground swinging coils in the field of the compass, energizing the coils of the stationary unit from a control station spaced from the compass to create a plurality of regulated, electromagnetic fields at the compass which with the horizontal component of the earth's magnetic field at the directed position of the craft provide a number of resultant fields with directivity corresponding to a succession of known azimuth directions over a range of 360 degrees, and preparing a deviation table by observation of the error in the indicated headings for each of the respective known azimuth directions on the card of the magnetic compass.

3. A method for correcting for deviation errors in a magnetic compass with a settable deviation compensator which consists in orienting the compass connected to a stationary unit with a plurality of fixed electrical ground swinging coils apart from the craft to utilize the compass in a predetermined direction in the earth's magnetic field with the deviation compensator set in a noncorrecting condition, electrically swinging the compass and stationary unit over a range of 360 degrees through a succession of observed azimuth directions by introducing direct current to the fixed coils through a number of settable electrical controllers to provide a directive field equivalent to the earth's field for each of the observed azimuth directions, making a record of the setting of the controllers for each of the observed azimuth directions, positioning the craft in which the compass is to be located in the compass oriented predetermined direction in the earth's magnetic field, locating the compass and unit in the craft in their oriented condition in the earth's field, electrically ground swinging the stationary craft in accordance with the controller record by changing the settings of the controllers to reproduce the directive fields corresponding to each of the observed azimuth directions, observing the error in the headings indicated on the card of the compass for each of the respective observed directions, setting the deviation compensator of the compass in accordance with a record of the observed errors, and removing the unit from the compass.

4. A method for measuring deviation errors in a magnetic compass which consists in orienting the compass connected to a stationary unit with a plurality of fixed electrical ground swinging coils apart from the craft to utilize the compass in a predetermined direction in the earth's magnetic field, electrically swinging the compass and stationary unit over a range of 360 degrees through a succession of observed azimuth directions by introducing direct current to the fixed coils through a number of settable electrical controllers to provide a directive field equivalent to the earth's field for each of the observed azimuth directions, making a record of the setting of the controllers for each of the observed azimuth directions, positioning the craft in which the compass is to be located in the compass oriented predetermined direction in the earth's magnetic field, locating the compass and unit in the craft in their oriented condition in the earth's field, electrically ground swinging the stationary craft in accordance with the controller record by changing the settings of the controllers to reproduce the directive fields corresponding to each of the observed azimuth directions, and preparing a deviation table by observation of the error in the heading indicated on the card of the compass for each of the respective observed directions.

5. A method of correcting for deviation errors in a flux valve compass system with a settable deviation compensator which consists in orienting the flux valve of the system apart from the craft to utilize the system in a fixed predetermined direction in the earth's magnetic field with the deviation compensator set in a noncorrecting condition, electrically swinging the fixedly oriented flux valve over a range of 360 degrees through a succession of azimuth directions observed on the compass by introducing direct current to the windings of the flux valve through a number of settable electrical controllers to provide a directive field equivalent to the earth's field for each of the observed azimuth directions, making a record of the setting of the controllers for each of the observed azimuth directions of the flux valve, positioning the craft in which the system is to be located in the flux valve oriented predetermined direction in the earth's magnetic field, locating the system in the craft with the flux valve in its oriented condition in the earth's field, electrically ground swinging the stationary craft in accordance with the controller record by changing the settings of the controllers to reproduce the directive fields corresponding to each of the observed azimuth directions, observing the error in the heading indicated by the system for each of the respective observed directions, and setting the deviation compensator of the system in accordance with a record of the observed errors.

6. A method for measuring deviation errors in a flux valve compass system which consists in orienting the flux valve of the system apart from the craft to utilize the system in a fixed, predetermined direction in the earth's magnetic field, electrically swinging the fixedly oriented flux valve over a range of 360 degrees through a succession of azimuth directions observed on the compass by introducing direct current to the windings of the flux valve through a number of settable electrical controllers to provide a directive field equivalent to the earth's field for each of the observed azimuth directions, making a record of the setting of the controllers for each of the observed azimuth directions of the flux valve, positioning the craft in which the system is to be located in the flux valve oriented predetermined direction in the earth's magnetic field, locating the system in the craft with the flux valve in its oriented condition in the earth's field, electrically ground swinging the stationary craft in accordance with the controller record by changing the settings of the controllers to reproduce the directive fields corresponding to each of the observed azimuth directions, and preparing a deviation table by observation of the error in the heading indicated by the system for each of the respective observed directions.

7. A method of correcting for deviation errors in a flux valve compass system with deviation compensating controllers that introduce direct current to the secondary windings of the flux valve which consists in orienting the uncompensated flux valve of the system apart from the craft to utilize the system in a fixed, predetermined direction in the earth's magnetic field, electrically swinging the fixedly oriented flux valve over a range of 360 degrees through a succession of azimuth directions observed on the compass by introducing direct current to the windings of the flux valve through a number of settable electrical controllers to provide a directive field equivalent to the earth's field for each of the observed azimuth directions, making a record of the setting of the electrical swinging controllers for each of the observed azimuth directions of the flux valve, positioning the craft in which the system is to be located in the flux valve oriented predetermined direction in the earth's magnetic field, locating the system in the craft with the flux valve in its oriented condition in the earth's field, electrically ground swinging the stationary craft in accordance with the electrical swinging controller record by changing the settings of the controllers to reproduce the directive fields corresponding to each of the observed azimuth directions, observing the error in the heading indicated by the system for each of the respective observed directions, and adjusting the compensating controllers in accordance with a record of the observed errors.

8. A method of measuring deviation errors in a flux valve compass system which consists in positioning a craft with the valve of the system fixed therein in a predetermined direction in the earth's magnetic field, introducing direct current to the windings of the flux valve from a station spaced therefrom to create a plurality of regulated electromagnetic fields at the flux valve which with the horizontal component of the earth's magnetic field at the predetermined position of the craft provide a number of resultant fields with directivity corresponding to a succession of known azimuth directions over a range of 360 degrees, and preparing a deviation table by observation of the error in the indicated heading of the system for each of the respective created known directions.

9. A method of correcting for deviation errors in a flux valve compass system with deviation compensating controllers which consists in positioning a craft with the valve of the system fixed therein in a predetermined direction in the earth's magnetic field with the deviation compensating controllers in a non-correcting condition, introducing direct current to the windings of the flux valve from a station spaced therefrom to create a plurality of regulated, electromagnetic fields at the flux valve which with the horizontal component of the earth's magnetic field at the predetermined position of the craft provide a number of resultant fields with directivity corresponding to a succession of known azimuth directions over a range of 360 degrees, observing the error in the indicated heading of the system for each of the respective created known directions, and setting the deviation compensating controllers in accordance with the observed error to correct the system.

10. A method of determining the deviation error in the magnetic compass of a navigable craft comprising the steps of: fixedly positioning said compass with respect to a predetermined reference direction, apart from the craft and at a predetermined deviation-free reference location, generating at said position a plurality of magnetic fields which, together with the earth's magnetic field, produce a plurality of resultant magnetic fields directed at known angular directions throughout 360° with respect to said reference direction whereby said compass indicates said known directions; positioning said craft, with said compass normally installed therein and with its longitudinal axis aligned with said reference direction, at said location; regenerating, in the presence of said craft and compass, said plurality of resultant magnetic fields; and then determining the error between the direction then indicated by the compass and the known direction of said resultant fields.

11. A method of compensating for the deviation error in the magnetic compass of a navigable craft comprising the steps of: fixedly positioning said compass with respect to a predetermined reference direction, in the absence of the craft and at a predetermined deviation-free reference location, generating a plurality of magnetic fields which, together with the earth's magnetic field, produce a plurality of resultant magnetic fields directed at known angular directions throughout 360° with respect to said reference direction whereby said compass indicates said known directions; positioning said craft, with said compass normally installed therein and with its longitudinal axis aligned with said reference direction, at said location; regenerating, in the presence of said craft and compass, said plurality of resultant magnetic fields; determining the error between the direction then indicated by the compass and the known direction of said resultant fields; and then compensating said error by producing in the vicinity of said compass element a permanent magnetic field the direction of which is proportional to the detected error.

References Cited in the file of this patent

UNITED STATES PATENTS

| | | |
|---|---|---|
| 2,383,460 | Purves et al. | Aug. 28, 1945 |
| 2,427,654 | Beach | Sept. 23, 1947 |
| 2,581,428 | McCarthy | Jan. 8, 1952 |
| 2,593,070 | Stuart | Apr. 15, 1952 |